(12) United States Patent
Kim et al.

(10) Patent No.: US 6,510,484 B1
(45) Date of Patent: Jan. 21, 2003

(54) TECHNIQUE FOR CONTROLLING SYNCHRONOUS DEVICES AND ASYNCHRONOUS DEVICES CONNECTED TO AN INTER-INTEGRATED CIRCUIT BUS (I2C BUS)

(75) Inventors: Dae-won Kim, Sungnam (KR); Seok-bong Kang, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/342,830

(22) Filed: Jun. 28, 1999

(30) Foreign Application Priority Data

Jun. 30, 1998 (KR) .............................. 98-25470

(51) Int. Cl.$^7$ .............................................. G06F 13/00
(52) U.S. Cl. ...................................... 710/314; 710/110
(58) Field of Search ................................. 710/305, 306, 710/313

(56) References Cited

U.S. PATENT DOCUMENTS

| | | |
|---|---|---|
| 5,199,106 A | 3/1993 | Bourke et al. |
| 5,276,814 A | 1/1994 | Bourke et al. |
| 5,293,603 A | 3/1994 | MacWilliams et al. |
| 5,309,567 A | 5/1994 | Mizukami |
| 5,434,983 A | 7/1995 | Yaso et al. |
| 5,564,025 A | 10/1996 | De Freese et al. |
| 5,590,369 A | 12/1996 | Burgess et al. |
| 5,615,404 A | 3/1997 | Knoll et al. |
| 5,774,680 A | 6/1998 | Wanner et al. |
| 5,793,996 A | 8/1998 | Childers et al. |
| 5,809,261 A | 9/1998 | Lambrecht |
| 5,832,246 A | 11/1998 | Matsumoto |
| 5,835,785 A | 11/1998 | Overtoom et al. |
| 5,857,083 A | 1/1999 | Venkat |
| 5,878,237 A | 3/1999 | Olarig |
| 5,881,255 A | 3/1999 | Kondo et al. |
| 5,892,931 A | 4/1999 | Cohen et al. |
| 6,233,635 B1 * | 5/2001 | Son ............................ 710/315 |

* cited by examiner

*Primary Examiner*—Glenn A. Auve
(74) *Attorney, Agent, or Firm*—Robert E. Bushnell, Esq.

(57) ABSTRACT

A technique for controlling synchronous and asynchronous devices connected to an inter-integrated circuit bus (I2C bus) is designed such that, in a system using an inter-integrated circuit bus (I2C bus), the controlling system includes a central processing unit (CPU), a system memory and a shared memory, each of which is connected to the system bus. The shared memory saves information about a variety of devices, which are connected to the I2C bus. The controlling system further includes a microcontroller for communicating with the shared memory and for controlling the devices which are connected to the I2C bus, asynchronous master devices which are controlled by the microcontroller, and synchronous slave devices which are controlled by the microcontroller. The microcontroller, the non-synchronous master devices and the synchronous slave devices are connected to the I2C bus.

16 Claims, 4 Drawing Sheets

TECHNIQUE FOR CONTROLLING SYNCHRONOUS DEVICES AND ASYNCHRONOUS DEVICES CONNECTED TO AN INTER-INTEGRATED CIRCUIT BUS (I2C BUS)

CLAIM OF PRIORITY

This application makes reference to, incorporates the same herein, and claims all benefits accruing under 35 U.S.C. §119 from my application SYSTEM AND METHOD FOR CONTROLLING A SYNCHRONOUS DEVICE AND AN ASYNCHRONOUS DEVICE CONNECTED TO AN INTER-INTEGRATED CIRCUIT BUS (I2C BUS) filed with the Korean Industrial Property Office on Jun. 30, 1998 and there duly assigned Serial No. 25470/1998.

BACKGROUND OF THE INVENTION

1. Field of the Invention

This present invention relates to a technique for controlling synchronous devices and asynchronous devices which are connected to an inter-integrated circuit bus (I2C bus), and more particularly relates to a technique for controlling synchronous slave devices and asynchronous master devices connected to an inter-integrated circuit bus which analyzes requests and responses of the asynchronous master devices and the synchronous slave devices and provides a common interface.

2. Description of the Related Art

In an earlier structure of a system for controlling a slave device, a system connected to an I2C bus comprises an application program block, a microcontroller device driver for driving a microcontroller in accordance with the application program block's command, a central processing unit (CPU), a system memory connected to the CPU and a system bus, a shared memory, the microcontroller controlling slave devices in accordance with the microcontroller device driver's request and a plurality of slave devices connected to the I2C bus.

When a request to control devices connected to an I2C bus is made from an application program block, the earlier method for controlling a slave device comprises opening a device as an initialization for accessing the device, device-writing to perform the access and the request for controlling the device, device-reading to access the device and process the reply if there is a reply from the slave device, and device-closing, that is ending the access to the device.

However, such a system for controlling slave devices has a shared memory only including a microcontroller information saving area, a slave device controlling area, a slave device commanding area and a slave device response area, and so the controlling system considers only the slave devices and performs processing on only the slave devices but not on the master devices.

The following patents disclose features in common with the present invention but do not teach or suggest the technique for controlling synchronous devices and asynchronous devices connected to an I2C bus as in the present invention: U.S. Pat. No. 5,199,106 to Bourke et al., entitled INPUT OUTPUT INTERFACE CONTROLLER CONNECTING A SYNCHRONOUS BUS TO AN ASYNCHRONOUS BUS AND METHODS FOR PERFORMING OPERATIONS ON THE BUS, U.S. Pat. No. 5,276,814 to Bourke et al., entitled METHOD FOR TRANSFERRING INFORMATION BETWEEN MAIN STORE AND INPUT OUTPUT BUS UNITS VIA A SEQUENCE OF ASYNCHRONOUS BUS AND TWO SYNCHRONOUS BUSES, U.S. Pat. No. 5,293,603 to MacWilliams et al, entitled CACHE SUBSYSTEM FOR MICROPROCESSOR BASED COMPUTER SYSTEM WITH SYNCHRONOUS AND ASYNCHRONOUS DATA PATH, U.S. Pat. No. 5,793,996 to Childerse et al., entitled BRIDGE FOR INTERCONNECTING A COMPUTER SYSTEM BUS, AN EXPANSION BUS AND A VIDEO FRAME BUFFER, U.S. Pat. No. 5,835,785 to Overtoom et al., entitled MULTIPLEXED THREE LINE SYNCHRONOUS/FULL-DUPLEX ASYNCHRONOUS DATA BUS AND METHOD THEREFOR, U.S. Pat. No. 5,774,680 to Wanner et al., entitled INTERFACING DIRECT MEMORY ACCESS DEVICES TO A NON-ISA BUS, U.S. Pat. No. 5,615,404 to Knoll et al., entitled SYSTEM HAVING INDEPENDENTLY ADDRESSABLE BUS INTERFACES COUPLED TO SERIALLY CONNECTED MULTI-PORTED SIGNAL DISTRIBUTORS GENERATING AND MAINTAINING FRAME BASED POLLING SCHEDULE FAVORING ISOCHRONOUS PERIPHERALS, U.S. Pat. No. 5,564,025 to De Freese et al., entitled APPARATUS FOR ARBITRATING REQUESTS FOR ACCESS FROM SLAVE UNITS BY ASSOCIATING THE REQUESTS WITH MASTER UNITS AND DETERMINING THE RELATIVE PENDENCY THEREOF IN A RADIO BASE STATION TRANSCEIVER, U.S. Pat. No. 5,590,369 to Burgess et al., entitled BUS SUPPORTING A PLURALITY OF DATA TRANSFER SIZES AND PROTOCOLS, U.S. Pat. No. 5,309,567 to Mizukami, entitled STRUCTURE AND METHOD FOR AN ASYNCHRONOUS COMMUNICATION PROTOCOL BETWEEN MASTER AND SLAVE PROCESSORS, U.S. Pat. No. 5,434,983 to Yaso et al., entitled DATA PROCESSING APPARATUS HAVING FIRST BUS WITH BUS ARBITRATION INDEPENDENT OF CPU, SECOND BUS FOR CPU, AND GATE BETWEEN FIRST AND SECOND BUSES, U.S. Pat. No. 5,892,931 to Cohen et al., entitled METHOD AND APPARATUS FOR SPLITTING A BUS TARGET RESPONSE BETWEEN TWO DEVICES IN A COMPUTER SYSTEM, U.S. Pat. No. 5,857,083 to Venkat, entitled BUS INTERFACING DEVICE FOR INTERFACING A SECONDARY PERIPHERAL BUS WITH A SYSTEM HAVING A HOST CPU AND A PRIMARY PERIPHERAL BUS, U.S. Pat. No. 5,878,237 to Olarig, entitled APPARATUS, METHOD AND SYSTEM FOR A COMPUTER CPU AND MEMORY TO PCI BRIDGE HAVING A PLURALITY OF PHYSICAL PCI BUSES, U.S. Pat. No. 5,881,255 to Kondo et al., entitled BUS CONTROL SYSTEM INCORPORATING THE COUPLING OF TWO SPLIT-TRANSACTION BUSSES OF DIFFERENT HIERARCHY, and U.S. Pat. No. 5,809,261 to Lambrecht, entitled SYSTEM AND METHOD FOR TRANSFERRING DATA STREAMS SIMULTANEOUSLY ON MULTIPLE BUSES IN A COMPUTER SYSTEM.

SUMMARY OF THE INVENTION

The present invention is designed to solve the above problems. It is an object of the present invention to provide a technique for controlling synchronous devices and non-synchronous devices connected to an inter-integrated circuit bus, which technique analyzes requests and responses of non-synchronous master devices and synchronous slave devices and provides a common interface.

Other objects and advantages of the present invention will become apparent with reference to the following detailed description and the attached drawings.

In a system including a central processing unit (CPU) connected to a system bus, a system memory connected to the system bus, a shared memory connected to the system bus for storing information about a variety of devices which are connected to the I2C bus, a microcontroller connected to the I2C bus for communicating with the shared memory and for controlling the devices which are connected to the I2C bus, and a plurality of synchronous slave devices which are controlled by the microcontroller and are each connected to a first I2C bus, a system for controlling synchronous and non-synchronous devices connected to an inter-integrated circuit bus (I2C bus) comprises a plurality of non-synchronous master devices which are controlled by the microcontroller and are connected to a second I2C bus, and a third I2C bus for connecting the first I2C bus to the second I2C bus.

In a system connected to an inter-integrated circuit bus (I2C bus), which includes non-synchronous master devices, synchronous slave devices, a shared memory for saving information about the devices, an application program for controlling the devices through the shared memory, and a microcontroller device driver, a method of controlling synchronous and non-synchronous devices comprises the steps of accessing the devices through the shared memory for saving information about the non-synchronous master devices and synchronous slave devices in the same manner, regardless of the type of device, when there is a request for controlling the devices, performing the controlling request according to each device through the shared memory by the application program, and processing responses from the devices by the shared memory and the microcontroller device driver.

DETAILED DESCRIPTION OF THE INVENTION

Figure 1:
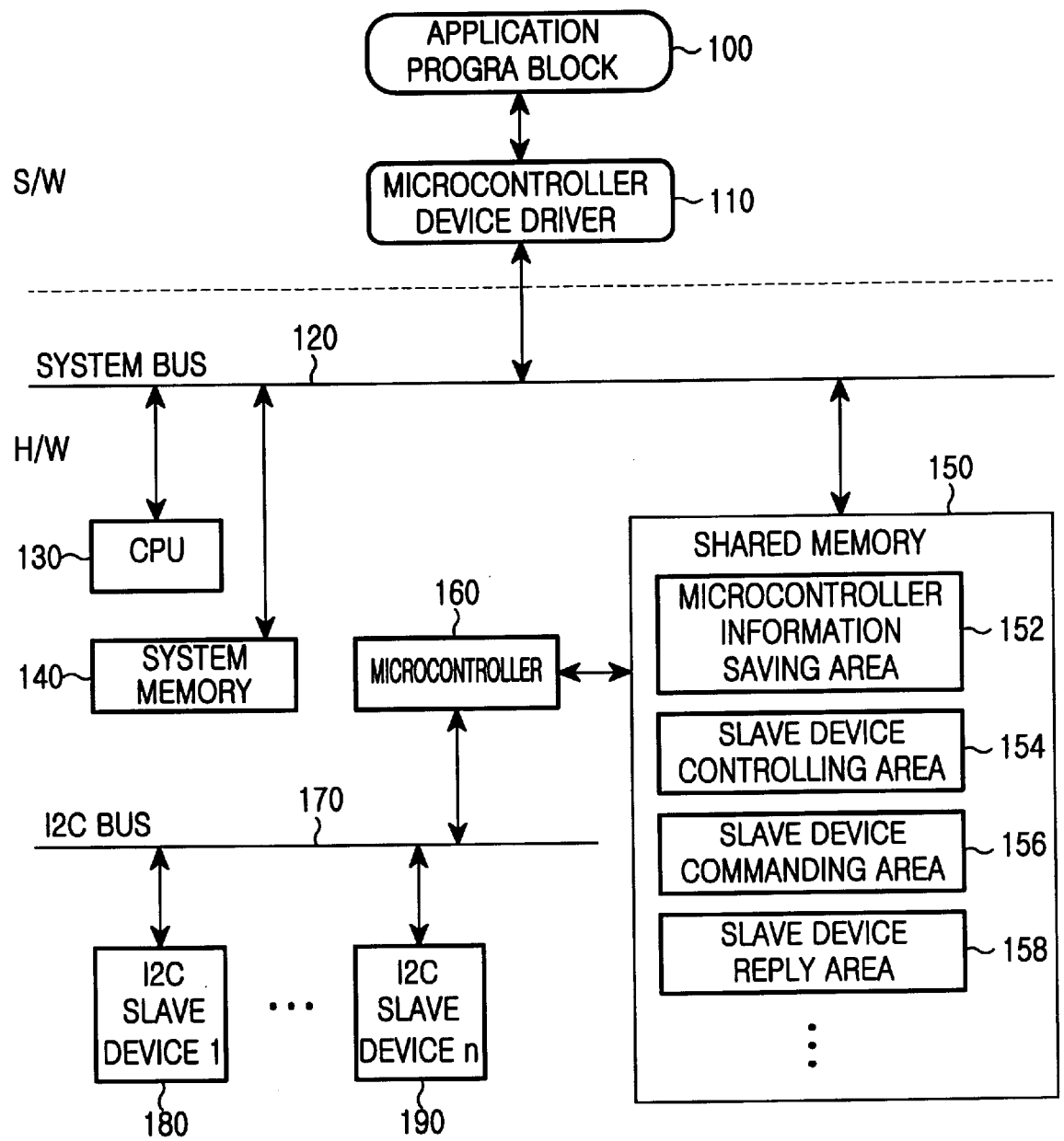
FIG. 1 illustrates a structure of a system for controlling synchronous devices in accordance with the related art.

In accordance with one embodiment of the present invention, in a system including a central processing unit (CPU) connected to a system bus, a system memory connected to the system bus, a shared memory connected to the system bus for storing information about a variety of devices which are connected to the I2C bus, a microcontroller connected to the I2C bus for communicating with the shared memory and for controlling the devices which are connected to the I2C bus, and a plurality of synchronous slave devices which are controlled by the microcontroller and are each connected to a first I2C bus, a system for controlling synchronous and non-synchronous devices connected to an inter-integrated circuit bus (I2c bus) comprises a plurality of non-synchronous master devices which are controlled by the microcontroller and are connected to a second I2C bus, and a third I2C bus for connecting the first I2C bus with the second I2C bus.

Preferably, the shared memory comprises a microcontroller information saving area for saving information about the microcontroller, a slave device controlling area, a master device controlling area, a slave device commanding area, a master device commanding area, a slave device reply area and a master device reply area. Each of the controlling areas can also be referred to as a "controlling signal information saving area"; each of the commanding areas can also be referred to as a "commanding signal information saving area"; and each of the reply areas can also be referred to as a "reply signal information saving area".

Preferably, the microcontroller is operated in accordance with a controlling command of a microcontroller device driver controlled by an application program.

In accordance with another embodiment of the present invention, in a system connected to an inter-integrated circuit bus (I2C bus), which includes non-synchronous master devices, synchronous slave devices, a shared memory for saving information about the devices, an application program for controlling the devices through the shared memory, and a microcontroller device driver, a method of controlling synchronous and non-synchronous devices comprises the steps of accessing the devices through the shared memory for saving information about the non-synchronous master devices and synchronous slave devices in the same manner, regardless of the type of device, when there is a request for controlling the devices, performing the controlling request according to each device through the shared memory by the application program, and processing responses from the devices by the shared memory and the microcontroller device driver.

Preferably, the step of performing the controlling request further comprises the steps of investigating whether a buffer for saving the controlling request is empty, returning after a processing error if the buffer is empty, investigating the contents of the request to determine whether the request is for a master device or for a slave device if the buffer is not empty, setting an address of the master device in a master device commanding signal saving area of the shared memory if the request is for the master device, setting an address of the slave device in a slave device commanding signal saving area of the shared memory if the request is for the slave device, investigating whether a signal to indicate a status of preparation of devices within the shared memory is set within a predetermined time period, ending after a processing error if the signal to indicate a status of preparation is not set within the predetermined time period, and returning after indicating the success of the execution if the signal indicating the status of preparation is set within the predetermined time period.

Preferably, the step of processing a response further comprises the steps of calling an interrupt handler of a microcontroller device driver which has been in a standby status if an interrupt is generated from a microcontroller, determining whether there is an interrupt signal in a slave controlling signal saving area and in a master controlling signal saving area of a shared memory and returning if there is not an interrupt signal in both areas, establishing a microcontroller reply area to the corresponding device reply area if there is an interrupt signal in any of two areas, re-establishing an interrupt bit of a controlling signal saving area of the corresponding device of the shared memory, and establishing an interrupt acknowledge signal and copying the contents of the microcontroller reply area to a system buffer operating in a manner of queue and returning.

FIG. 1 illustrates the structure of a system for controlling a slave device as discussed in the Description of the Related Art above.

In FIG. 1, the system is connected to an I2C bus 170 and comprises slave devices 180 and 190 connected to the I2C bus. Other elements include application program block 100, microcontroller device driver 110, system bus 120, central processing unit (CPU) 130, system memory 140, and microcontroller 160.

The microcontroller information saving area 152, slave device controlling area 154, slave device commanding area 156 and slave device reply area 158 of the shared memory 150 are also illustrated.

Figure 2:
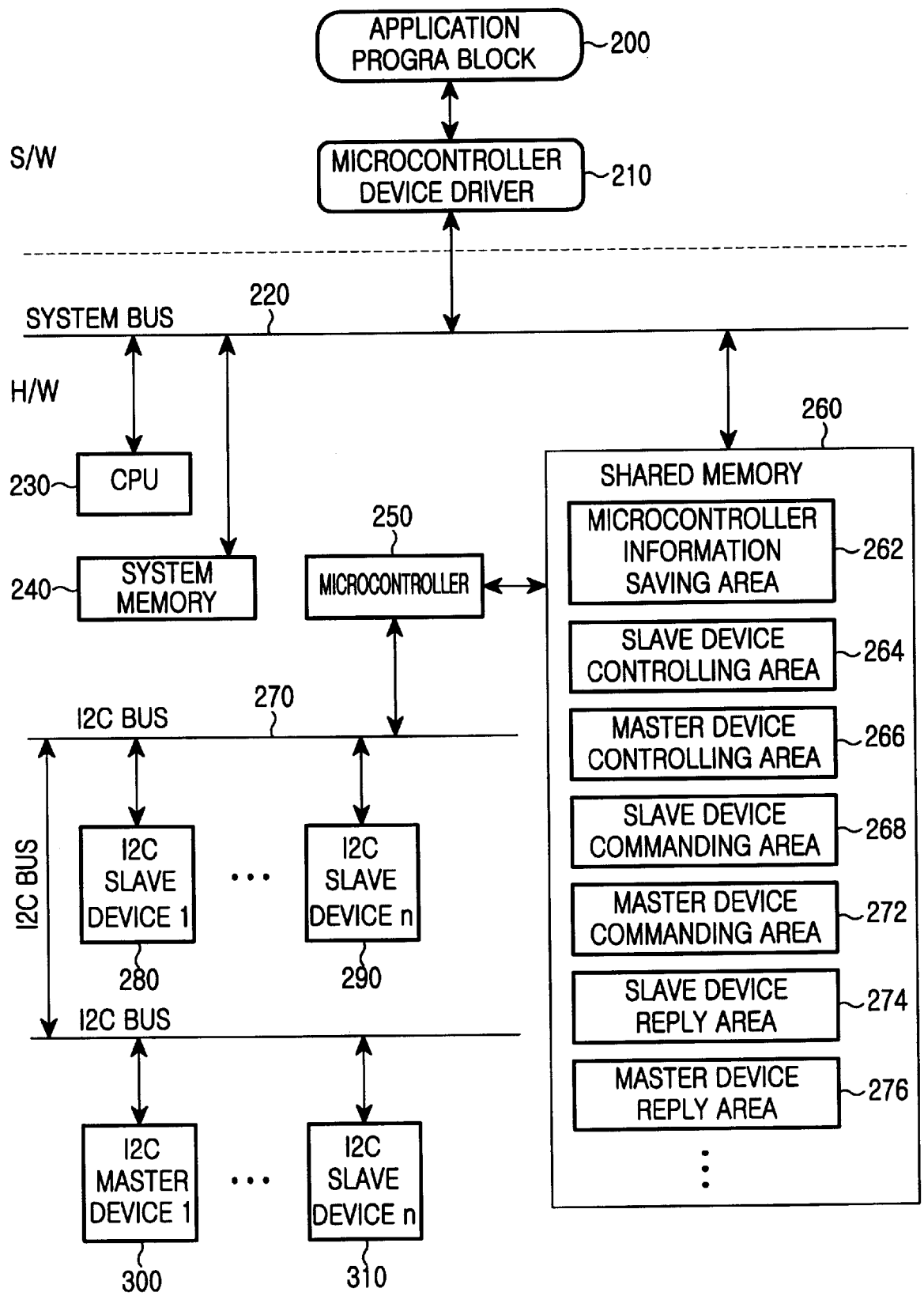
FIG. 2 illustrates a structure of a system for controlling synchronous and asynchronous devices in accordance with the present invention.

FIG. 2 illustrates a structure of a system for controlling synchronous and non-synchronous devices in accordance with the present invention.

Referring to the FIG. 2, the controlling system of the present invention comprises a central processing unit (CPU) 230, a system memory 240 for saving the storage items of the system, and a shared memory 260 for saving a variety of information about devices connected to an I2C bus 270, all of which are connected to the system bus 220. The controlling system further comprises a microcontroller 250, a plurality of non-synchronous master devices 300 and 310, and a plurality of synchronous slave devices 280 and 290. The microcontroller 250 that communicates with the shared memory 260 is connected to the I2C bus 270 and controls devices connected to the I2C bus 270. Both the plurality of non-synchronous master devices 300 and 310 and the plurality of synchronous slave devices 280 and 290 are connected to the I2C bus 270 which is controlled by the microcontroller 250.

An application program block 200 controls devices connected to I2C bus 270, through a microcontroller device driver 210.

Requests for controlling the devices 300,310,280 and 290 connected to the I2C bus 270, and replies from the devices 300, 310, 280 and 290, are made by a shared memory 260 which communicates with microcontroller 250. The shared memory 260, positioned between the microcontroller device driver 210 and the microcontroller 250, has specific areas for saving a variety of information and requests and replies of master devices and slave devices.

The specific areas include a microcontroller information saving area 262, a slave device controlling area 264, a master device controlling area 266, a slave device commanding area 268, a master device commanding area 272, a slave device reply area 274, and a master device reply area 276. Each of the controlling areas can also be referred to as a "controlling signal information saving area"; each of the commanding areas can also be referred to as a "commanding signal information saving area"; and each of the reply areas can also be referred to as a "reply signal information saving area".

Figure 3:
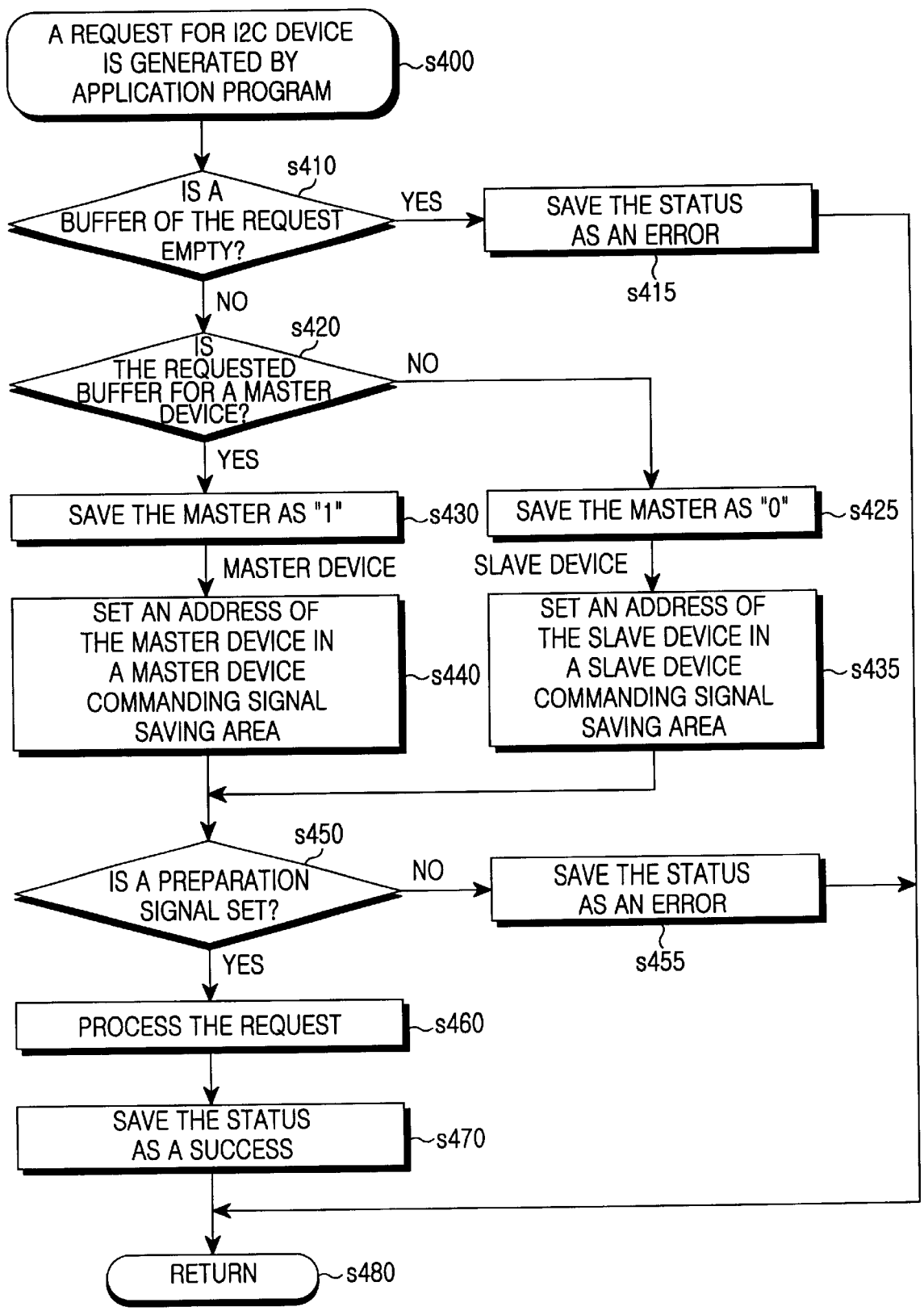
FIG. 3 is a flowchart illustrating the procedure for processing requests of devices connected to an I2C bus in accordance with the present invention.

FIG. 3 is a flowchart illustrating a procedure for processing requests of devices connected to an I2C bus in accordance with the present invention.

The processing procedure illustrated in FIG. 3 begins when a request for an I2C device is generated by an application program (step 400), and comprises the steps of investigating whether a buffer of the request is empty (step 410), returning after saving the status as a processing error if the buffer is empty (steps 415 and 480), determining whether the request is for a master device or for a slave device through the investigation of the contents of the buffer if the buffer is not empty (step 420), setting an address of the master device in a master device commanding signal saving area of a shared memory if the request is for the master device (steps 430 and 440), setting an address of the slave device in a slave device commanding signal saving area of a shared memory if the request is for the slave device (steps 425 and 435), determining whether a signal indicating preparation of devices within the shared memory is set within a predetermined time period (step 450), returning after a processing error because a microcontroller is not prepared if the preparation signal has not been set (steps 455 and 480), and returning after indicating a performance success because the microcontroller processes the request if the preparation signal has been set(steps 460, 470 and 480).

Figure 4:
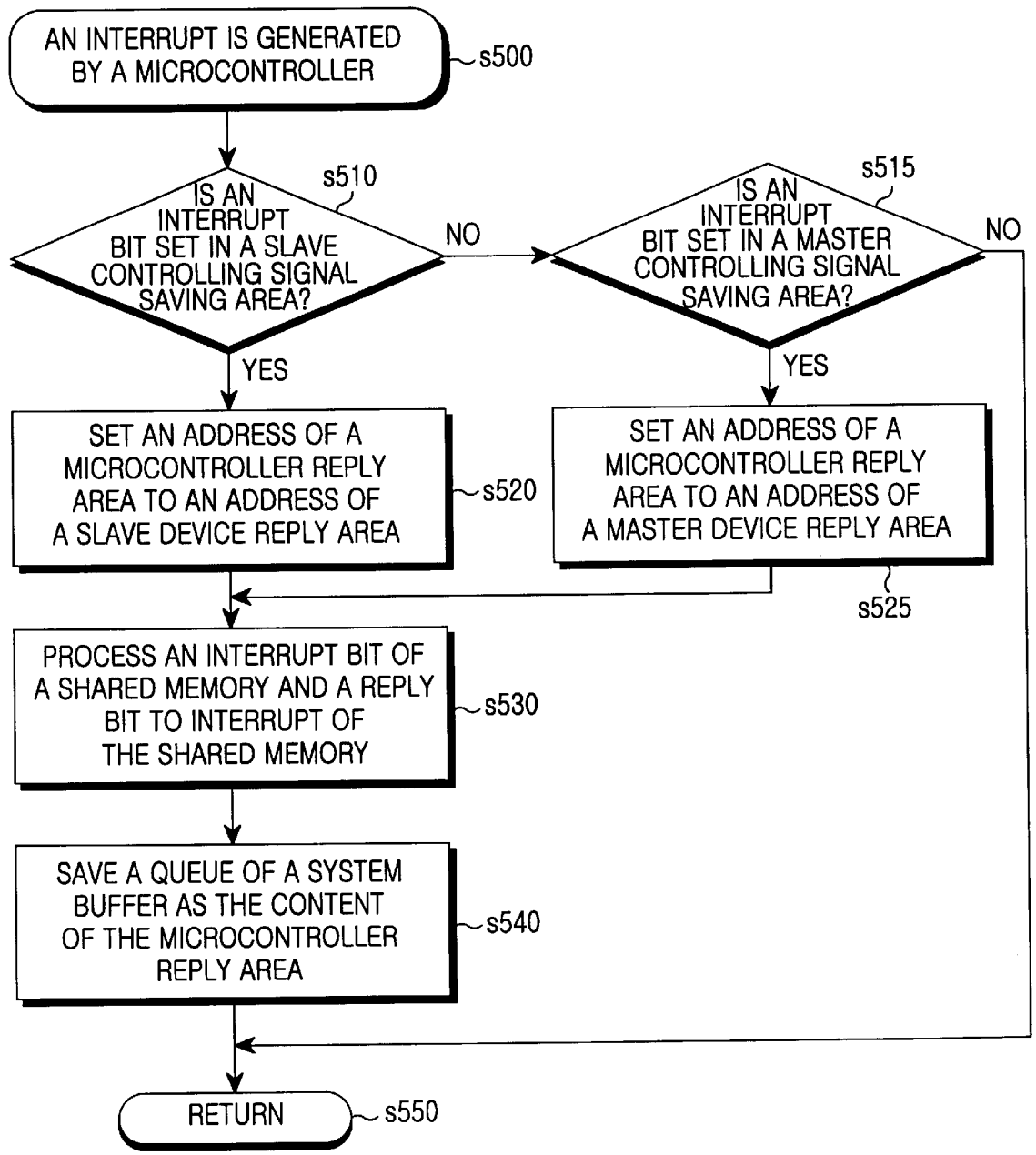
FIG. 4 is a flowchart illustrating the procedure for processing responses of devices connected to an I2C bus in accordance with the present invention.

FIG. 4 is a flowchart illustrating the procedure for processing responses of devices connected to an I2C bus in accordance with the present invention. The procedure comprises the steps of calling an interrupt handler of a microcontroller device driver which has been in a standby status if an interrupt is generated from a microcontroller (step 500), determining whether there is an interrupt bit set in a slave controlling signal saving area and in a master controlling signal saving area of a shared memory (steps 510 and 515), returning if there is no interrupt signal in either of the areas (step 550), establishing a microcontroller reply area to the corresponding device reply area if there is an interrupt signal in either of the two areas (steps 520 and 525), re-establishing an interrupt bit of the controlling signal saving area of the corresponding device of the shared memory and establishing an interrupt acknowledge signal (step 530), and copying the contents of the microcontroller reply area to a system buffer operating in the manner of a queue (step 540), and returning (step 550).

In accordance with the above described present invention, an application program uses a common interface to control non-synchronous master devices and synchronous slave devices, and a microcontroller device driver processes requests of each device and replies from each device.

Also, the processing speed increases because the present invention sends a command to the slave device while the master device operates and vice-versa.

While the invention is susceptible to various modification and alternative forms, specific embodiments thereof have been shown by way of example in the drawings and detected description. It should be understood, however, that the present invention is not limited to the particular forms disclosed, but on the contrary, the intention is to cover all modifications, equivalents, and alternatives falling within the spirit and scope of the invention as defined by the appended claims.

What is claimed is:

1. A system for controlling synchronous and asynchronous devices, comprising:
   a central processing unit (CPU) connected to a system bus;
   a system memory connected to the system bus;
   a shared memory connected to the system bus for storing information about devices;
   a microcontroller connected to the shared memory and to a first I2C bus for communicating with the shared memory and for controlling the devices;
   a plurality of synchronous slave devices which are controlled by the microcontroller, each of said synchronous slave devices being connected to the first I2C bus;
   a plurality of asynchronous master devices which are controlled by the microcontroller, each of said asynchronous master devices being connected to a second I2C bus; and
   a third I2C bus for connecting the first I2C bus with the second I2C bus.

2. The system as set forth in claim 1, said shared memory comprising:
   a microcontroller information saving area;
   a slave device controlling signal information saving area;
   a master device controlling signal information saving area;
   a slave device commanding signal information saving area;
   a master device commanding signal information saving area;
   a slave device reply signal information saving area; and
   a master device reply signal information saving area.

3. The system as set forth in claim 2, further comprising a microcontroller device driver connected to the system bus, said microcontroller being operated in accordance with a controlling command of the microcontroller device driver.

4. The system as set forth in claim 3, wherein said microcontroller device driver is controlled by an application program.

5. The system as set forth in claim 1, further comprising a microcontroller device driver connected to the system bus, said microcontroller being operated in accordance with a controlling command of the microcontroller device driver.

6. The system as set forth in claim 5, wherein said microcontroller device driver is controlled by an application program.

7. A method for controlling synchronous and asynchronous devices in a system connected to an inter-integrated circuit bus (I2C bus), said system including asynchronous master devices, synchronous slave devices, a shared memory for saving information about the devices, an application program for controlling the devices through the shared memory, and a microcontroller device driver, said method comprising the steps of:
   accessing the devices through the shared memory so as to save information about the asynchronous master devices and the synchronous slave devices in the same manner regardless of the type of device;
   upon there being a request for controlling the devices, performing the controlling request according to each device through the shared memory by the application program; and
   processing responses from the devices by the shared memory and the microcontroller device driver.

8. The method as set forth in claim 7, wherein the step of performing the controlling request comprises the steps of:
   determining whether a buffer for saving the controlling request is empty;
   returning after saving a processing error if the buffer is empty;
   investigating the contents of the request to determine whether the request is for a master device or for a slave device if the buffer is not empty;
   setting an address of the master device in a master device commanding signal saving area of the shared memory if the request is for the master device;
   setting an address of the slave device in a slave device commanding signal saving area of the shared memory if the request is for the slave device;
   determining whether a signal to indicate a status of preparation of devices within the shared memory is set within a predetermined time period;
   ending after saving a processing error if the signal to indicate a status of preparation is not set within the predetermined time period; and
   returning after indicating the success of the execution if the signal to indicate the status of preparation is set within the predetermined time period.

9. The method as set forth in claim 8, wherein the step of processing responses further comprises the steps of:
   calling an interrupt handler of the microcontroller device driver which has been in a standby status if an interrupt is generated by a microcontroller;
   determining whether there is an interrupt signal in a slave controlling signal saving area and in a master controlling signal saving area of a shared memory, and returning if there is no interrupt signal in either of the saving areas;
   establishing a microcontroller reply area corresponding to a reply area of a given device when there is an interrupt signal in the saving area of the given device;
   re-establishing an interrupt bit of the controlling signal saving area of the given device in the shared memory, and establishing an interrupt acknowledge signal; and
   copying the contents of the microcontroller reply area to a system buffer operating in a manner of a queue, and then returning.

10. The method as set forth in claim 7, wherein the step of processing responses comprises the steps of:
   calling an interrupt handler of the microcontroller device driver which has been in a standby status if an interrupt is generated by a microcontroller;
   determining whether there is an interrupt signal in a slave controlling signal saving area and in a master controlling signal saving area of a shared memory, and returning if there is no interrupt signal in either of the saving areas;
   establishing a microcontroller reply area corresponding to a reply area of a given device when there is an interrupt signal in the saving area of the given device;
   re-establishing an interrupt bit of the controlling signal saving area of the given device in the shared memory, and establishing an interrupt acknowledge signal; and
   copying the contents of the microcontroller reply area to a system buffer operating in a manner of a queue, and then returning.

11. A system for controlling synchronous and asynchronous devices, comprising:
   a shared memory connected to a system bus for storing information about devices;
   a microcontroller connected to the shared memory and to a first I2C bus for communicating with the shared memory and for controlling the devices;
   a plurality of synchronous slave devices which are controlled by the microcontroller, each of said synchronous slave devices being connected to the first I2C bus;
   a plurality of asynchronous master devices which are controlled by the microcontroller, each of said asynchronous master devices being connected to a second I2C bus; and
   a third I2C bus for connecting the first I2C bus with the second I2C bus.

12. The system as set forth in claim 11, said shared memory comprising:
   a microcontroller information saving area;
   a slave device controlling signal information saving area;

a master device controlling signal information saving area;

a slave device commanding signal information saving area;

a master device commanding signal information saving area;

a slave device reply signal information saving area; and a master device reply signal information saving area.

13. The system as set forth in claim 12, further comprising a microcontroller device driver connected to the system bus, said microcontroller being operated in accordance with a controlling command of the microcontroller device driver.

14. The system as set forth in claim 13, wherein said microcontroller device driver is controlled by an application program.

15. The system as set forth in claim 11, further comprising a microcontroller device driver connected to the system bus, said microcontroller being operated in accordance with a controlling command of the microcontroller device driver.

16. The system as set forth in claim 15, wherein said microcontroller device driver is controlled by an application program.

* * * * *